United States Patent
Levy

[11] 3,901,957
[45] Aug. 26, 1975

[54] HEAT EXCHANGER EMPLOYING CONDENSATION

[75] Inventor: Claude Isaac Levy, Paris, France

[73] Assignee: L'Industrielle de Chauffage, Boulogne-Billancourt, France

[22] Filed: Oct. 15, 1973

[21] Appl. No.: 406,222

[30] Foreign Application Priority Data
Oct. 19, 1972 France .............................. 72.37038

[52] U.S. Cl. ...................... 261/6; 55/223; 55/228; 55/260; 261/8; 261/17; 261/110; 261/117
[51] Int. Cl. ................. B01d 47/00; F22d 1/28
[58] Field of Search .......... 165/110, 111, 114, 116; 55/260, 228, 223; 198/115 SB; 261/6, DIG. 9, 8, 117, 17, 110

[56] References Cited
UNITED STATES PATENTS

| 123,465 | 2/1872 | Ellerbrock | 165/116 |
|---|---|---|---|
| 420,718 | 2/1890 | Cochrane | 55/260 |
| 1,609,611 | 12/1926 | Dovel | 55/260 |
| 2,663,547 | 12/1953 | Evans | 165/114 |
| 2,775,310 | 12/1956 | Shelton | 55/223 |
| 3,183,645 | 5/1965 | Teller | 55/260 |
| 3,439,724 | 4/1969 | Mason | 55/223 |
| 3,624,696 | 11/1971 | Cohen | 55/223 |
| 3,807,143 | 4/1974 | Dunn | 55/223 |

Primary Examiner—Albert W. Davis
Assistant Examiner—Daniel J. O'Connor
Attorney, Agent, or Firm—Eric P. Schellin

[57] ABSTRACT

Heat exchanger comprising a tower in which hot gases of combustion and a cold exchange fluid sprayed at the top of the tower flow in counter-current manner and a tank for recovering the fluid in the lower part of the tower connected to means for conducting the fluid to a circuit of utilization. Perforated baffles are placed in the upper part of the tower and an inclined solid non-perforated baffle is placed in the lower part of the tower above the inlet of the combustion gases and has a lower face adapted to be licked by the gases of combustion and an upper face carrying cups for maintaining the exchange fluid throughout substantially the whole of the area of the upper face.

4 Claims, 2 Drawing Figures

HEAT EXCHANGER EMPLOYING CONDENSATION

The present invention relates to a heat exchanger employing the condensation method intended in particular to recover heat carried along by combustion gases.

Heat exchangers are already known which permit recovering a large amount of heat from gases of combustion by the condensation of the major part of the water vapour contained in the gases.

Thus, heat exchangers or recoverers have been proposed which comprise a tower provided with perforated baffles and in which flow in a counter-current manner, on one hand hot combustion gases and, on the other hand, a cold fluid sprayed in the upper part of the tower, means recovering the fluid in the lower part of the tower and means for conducting the fluid to a utilization circuit.

An object of the present invention is to improve an exchanger of this type by in particular improving the exchange between the gases of combustion and the fluid so as to increase the temperature of the heated fluid to the maximum extent.

The invention provides a heat exchanger which comprises a tower having perforated baffles in its upper part and in which there is disposed in the lower part of the tower above the inlet of the gases of combustion, an inclined solid nonperforated baffle whose lower part is licked by the gases of combustion and which/has in its upper part cups adapted to maintain exchange fluid throughout substantially the whole of its surface area.

This lower baffle permits insuving a good exchange between the fluid and the gases of combustion in the region where the gases of combustion are the hotest and therefore an improved recovery of heat.

In a particular embodiment of the invention, the edge of the lowermost of said cups is finely toothed so as to ensure a flow of the exchange fluid to a recovery tank in the form of a substantially continuous film.

The tower may moreover comprise one or more vertical partition walls welded to its lateral and upper walls and extending into an exchange fluid recovery tank to a depth which is sufficient to ensure the sealing of the regions thus defined by the partition wall or walls. Such an arrangement permits connecting two or more boilers to the same heat exchanger while conserving independent gas circuits. Each region of the tower is then provided with an inlet and an outlet for the gases of combustion. On the other hand, the fluid coming from the different regions may then be received in a single tank, drawn from the tank by a single pump and then, after having given off its heat to the circuit of utilization, possibly sent back to the spraying systems of the different regions.

It is thus possible to employ a single heat exchanger with a plurality of boilers, these boilers operating, if desired, in a practically independent manner without interference therebetween.

The means for recovering intermediate fluid advantageously comprise two vessels, namely a first vessel disposed in the lower part of the tower and adapted to separate the dust by decantation, and a second vessel adapted to filter the intermediate fluid issuing from the first vessel. Such an arrangement permits the elimination of the dust initially contained in the gases of combustion which are carried along by the exchange fluid and thus the avoidance of a diffusion of this dust in the circuit of the exchange fluid.

In order to increase the temperature of the exchange fluid, it is possible to incorporate in the recovery tank a gas burner of conventional type which develops its flame in a fire box immersed in the exchange fluid contained in the recovery tank, the burnt gas-evacuating pipe or pipes of which fire box open out above the level of the exchange fluid contained in this tank under the baffles of the tower.

Further features and advantages of the invention will be apparent from the ensuing description with reference to the accompanying drawings.

Figure 1:
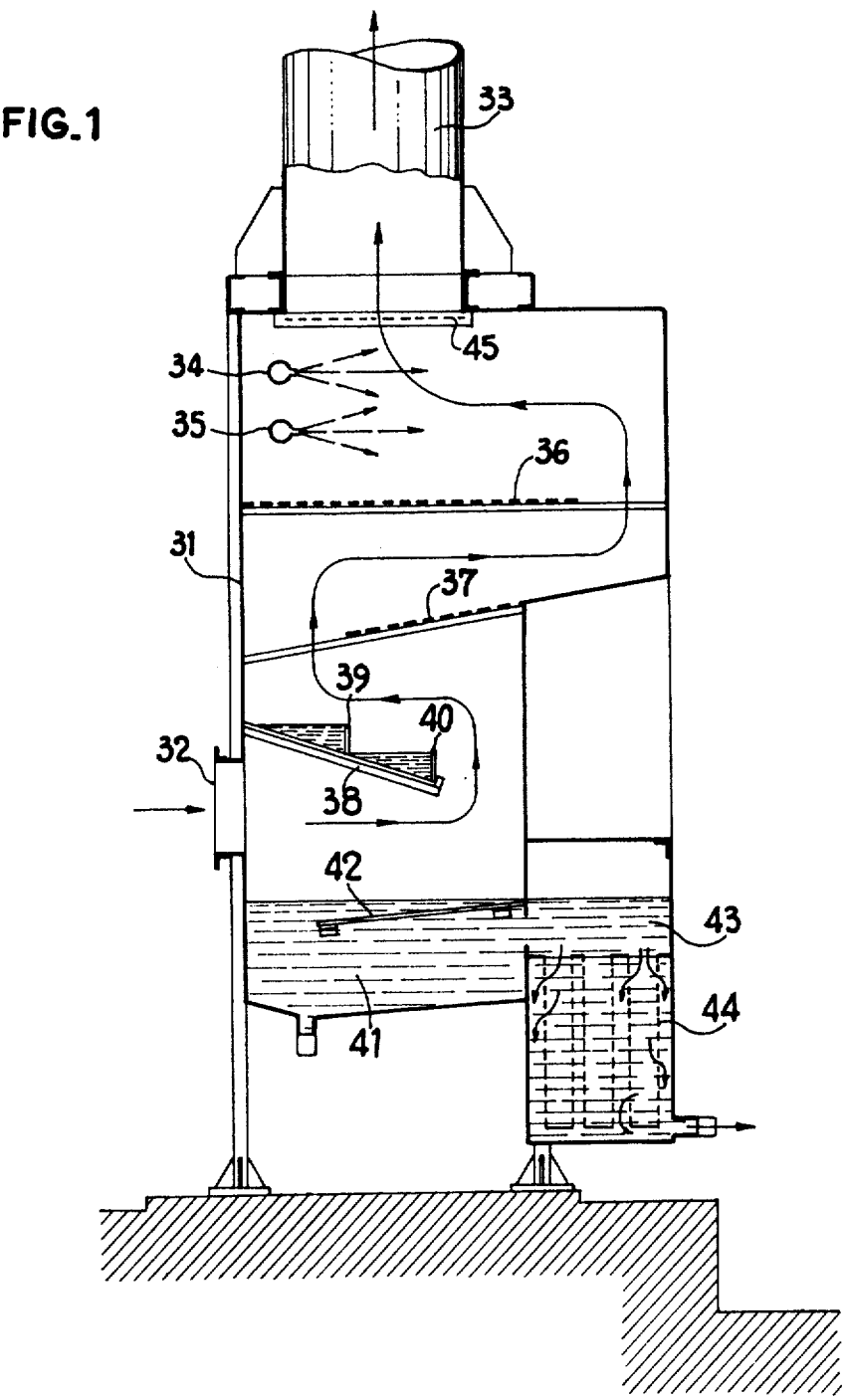
FIG. 1 is a sectional view of a heat exchanger according to the invention.

The exchanger shown in FIG. 1 comprises a tower 31 having a rectangular-sided shape provided in the lower part of one of its lateral walls with an inlet 32 for gases of combustion and in its upper part with a gas-evacuating stack 33 at the upstream or lower end of which there is provided a droplet separting means 45. This tower 31 comprises in the vicinity of the evacuating stack 33 spraying systems 34 and 35 for spraying an exchange fluid, which is water in the presently described embodiment, these systems spraying the fluid in a horizontal direction. The tower 31 further comprises upper perforated baffles 36, 37 and an inclined solid non-perforated baffle 38 disposed just above the inlet 32 of the gases of combustion. This lower baffle 38 has in its upper part cups 39, 40 forming small receptacles which maintain the exchange flluid throughout the areas of the baffle. The edge of the lower cup 40 is finely toothed and ensures an even flow of the exchange fluid into a decantation pan or vessel 41 disposed in the lower part of the tower.

The decantation pan has a baffle 42 adapted to prolong the part of the exchange fluid in the decantation vessel before its passage to a second pan 43 disposed laterally of the pan 41 and comprising a filtering unit 44 adapted to eliminate dust which has not been retained in the pan 41. The fluid is then taken off and conducted to the stage of utilization where it gives off its heat and then, when cooled, returned to the spraying systems.

The utilization may either be a surface exchanger which is incorporated or not incorporated in the apparatus or a heating circuit comprising a very varied heat exchange surfaces as for example air heating batteries.

It is possible also to envisage the direct utilization in an open circuit of the exchange fluid in the form of a luke warm water, the spraying systems then being supplied with additional cold water.

Such an arrangement permits, on one hand, an improved exchange between the gases of combustion and exchange fluid owing in particular to the lower baffle which ensures a heating of the fluid by the gases entering the tower and, on the other hand, an easy elimination of dust from the gases of combustion which are carried along by the exchange fluid.

Figure 2:
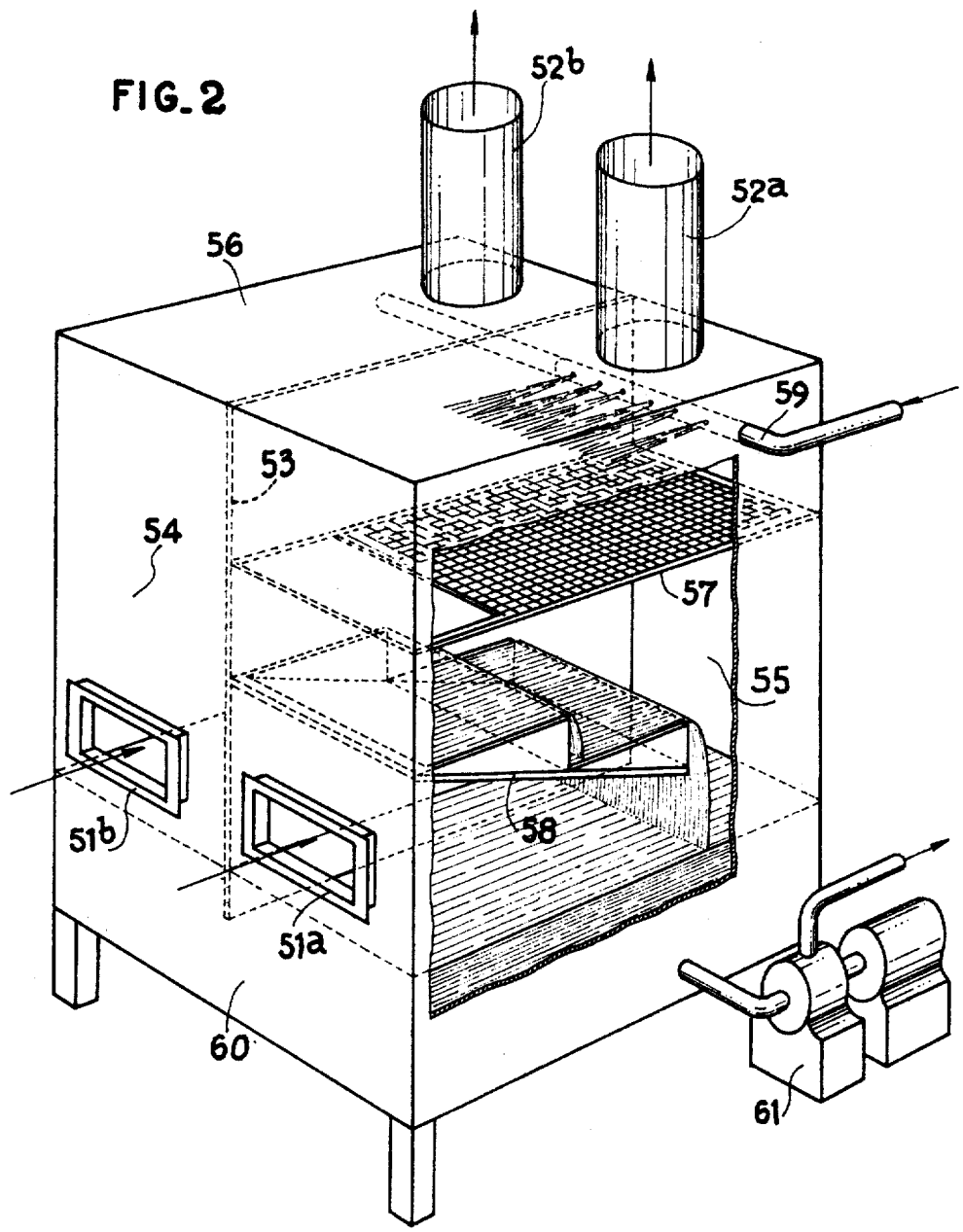
FIG. 2 is a perspective view, with a part cut away of a modification of the exchanger.

Such an arrangement may moreover be easily provided with vertical position walls welded to the lateral and upper walls of the tower and immersed a few centimetres into the fluid contained in the decantation pan for the purpose of the connection of a plurality of boilers to the same exchanger, as shown in FIG. 2.

The exchanger shown in FIG. 2 comprises in parallel two inlets 51a, 51b for the gases of combustion (coming from two separate boilers) and two stacks 52a, 52b for evacuating the gases.

Defined between these inlets and outlets are two separate gas flow circuits which are further defined by a vertical partition wall 53 welded to the lateral walls 54, 55 and upper wall 56 of the exchanger. The latter moreover comprises upper baffles 57 and lower baffles 58 respectively similar to the baffles 37 and 38 of the heat exchanger shown in FIG. 1.

The exchanger comprises a spraying system 59 and a single recovery tank 60 into which extend the separating wall 53. The level of the exchange fluid in this tank is so adapted as to obtain an effective separation of the two gas circuits. The fluid recovered in the tank is taken up by a pump 61 and sent to a utilization stage and then returned to the spraying system 59.

Having now described my invention what I claim as new and desire to secure by Letters Patent is:

1. A heat exchanger comprising a tower, lower inlet means and upper outlet means for hot gases of combustion, and upper cold fluid spraying means whereby the hot gases and cold fluid flow in a counter-current manner in the tower, means for recovering the fluid in the lower part of the tower wherein the means for recovering the fluid comprise a decantation pan disposed in the lower part of the tower and a pan disposed laterally of the decantation pan and comprising a filtering unit, said decantation pan overflowing into said filtering pan, and means for conducting the fluid to a circuit of utilization, perforated baffle means extending partially across the top of the tower to direct hot gases in a back and forth movement an inclined solid nonperforated baffle located in the lower part of the tower above the inlet of the gases of combustion and having a lower part positioned to be licked by the gases of combustion and an upper part, and cups carried by the upper part of the solid baffle for maintaining the exchange fluid throughout substantially the whole of the surface area of said upper part.

2. A heat exchanger as claimed in claim 1, wherein an edge of a lowermost of said cups is finely toothed so as to ensure an overflow of the exchange fluid in the form of substantially continuous film, the means for recovering the fluid comprising a recovery tank which receives said overflow of fluid.

3. A heat exchanger as claimed in claim 1, comprising at least one substantially vertical partition wall welded to lateral and upper walls of the tower and extending into the fluid recovering means which comprise a recovery tank to a depth sufficient to ensure the sealing of regions of the tower thus defined by the partition wall.

4. A heat exchanger as claimed in claim 1 wherein the means for recovering the exchange fluid comprise a decantation pan disposed in the lower part of the tower and a pan disposed laterally of the decantation pan and comprising a filtering unit.

* * * * *